(12) United States Patent  
Balko

(10) Patent No.: US 6,592,302 B2
(45) Date of Patent: Jul. 15, 2003

(54) PNEUMATIC TRANSMISSION SYSTEM AND BLOWER UNIT THEREFOR

(75) Inventor: Jack E. Balko, Framers Branch, TX (US)

(73) Assignee: Comco Systems, Lake Dallas, TX (US)

( * ) Notice: Subject to any disclaimer, the term of this patent is extended or adjusted under 35 U.S.C. 154(b) by 0 days.

(21) Appl. No.: 09/887,589

(22) Filed: Jun. 22, 2001

(65) Prior Publication Data

US 2002/0197117 A1 Dec. 26, 2002

(51) Int. Cl.⁷ ............................................... A01D 87/10
(52) U.S. Cl. ........................ 406/97; 406/105; 417/62; 417/315
(58) Field of Search ..................... 406/97, 105, 62; 417/315

(56) References Cited

U.S. PATENT DOCUMENTS 2,255,560 A * 9/1941 Fieber et al. .................. 60/430
5,147,154 A * 9/1992 Scott ........................... 406/112
5,584,613 A 12/1996 Greene et al. ................. 406/19
6,039,510 A 3/2000 Greene et al. ................. 406/21

* cited by examiner

Primary Examiner—Joseph A. Dillon
(74) Attorney, Agent, or Firm—Sidley Austin Brown & Wood LLP

(57) ABSTRACT

A blower unit is provided which is suitable for use in a pneumatic transmission system. The blower unit includes a housing having at least two inlet/outlet openings through which air can flow. Disposed within the housing are one or more blower motors, each blower motor for moving a volume of air from one of the at least two inlet/outlet openings to another. Also disposed within the housing are one or more bypass paths, each bypass path providing a route by which air can flow without flowing through an associated blower motor. A valve element is disposed within at least one of the bypass paths for substantially blocking air-flow through that bypass path when the associated blower motor is active.

41 Claims, 4 Drawing Sheets

PNEUMATIC TRANSMISSION SYSTEM AND BLOWER UNIT THEREFOR

FIELD OF THE INVENTION

The present invention is directed generally to a blower assembly suitable for use with a pneumatic transmission system. Specifically, this invention relates to a blower assembly which includes a blower motor and a bypass path. The bypass path provides an alternate route through the blower assembly, so that air may flow through the bypass path rather than the blower motor for reduced path resistance and therefore improved overall efficiency. In one aspect, the invention relates to a pneumatic transmission system with a blower unit having a blower motor and a bypass path.

BACKGROUND OF THE INVENTION

Blower assemblies where air flow can be selectively directed in either direction are commonly used in pneumatic transmission systems, which are widely known and are used to transmit articles from a first point to a second point, which is remote from the first point. Pneumatic transmission systems usually include at least two stations, a tube or conduit extending between the two stations, and a carrier which can be positioned within the tube so that it can be transmitted from one station to another.

A common example of a pneumatic transmission system is in drive-in bank teller facilities where business is conducted via a carrier transmitted between the bank and the remote drive-in terminal. Other examples include pneumatic transmission systems used for sending documents between different floors in a building or between offices which are located some distance apart.

Typical blower assemblies include two opposing blowers for selectively providing air-flow in opposite directions in the tube or conduit connecting the two stations. FIG. 1 shows an example of a pneumatic transmission system having this type of a conventional blower assembly. The blower assembly 10 includes a pair of vacuum cleaner blower motors 15A and 15B positioned in a blower tube 20 in pneumatic series with each other, meaning the vacuum cleaner blower motors 15A and 15B are within the same air flow path. Furthermore, the vacuum cleaner blower motors 15A and 15B are spatially separated from each other within the blower tube 20. The blower tube 20 and the vacuum cleaner blower motors 15A and 15B are disposed within a blower housing 25. The blower tube 20 is substantially open on one end and closed on the other end except for communication with a vent/inlet 30, which is for supplying or exhausting air. The blower assembly 10 communicates with a transport tube 35 via a conduit 40. The conduit 40 is attached at one end to the blower housing 25 and at its other end to a check/relief valve 45. The check/relief valve 45 controls air-flow between the conduit 40 and the transport tube 35 such that air may flow between the transport tube 35 and the conduit 40 or, alternately, air may flow between the conduit 40 and a second conduit 50. The second conduit 50 is connected at one end to the check/relief valve 45 and at its other end to a station 55. The transport tube 35 is connected to the station 55 at one end and to a second station 60 at its other end, and is of sufficient internal diameter such that a carrier 65 can be transmitted therethrough.

During normal operation, either the first blower motor 15A or the second blower motor 15B is activated based on a desired direction of travel for the carrier 65 through the transport tube 35. In a case where the first blower motor 15A is activated, air is pulled into the blower tube 20 through the vent/inlet 30 and pushed out of the blower tube 20 through the second blower motor 15B, then through the blower housing 25, the conduit 40, the check/relief valve 45, and the second conduit 50 to the station 55. In a case where the second blower motor 15B is activated, air is pushed out of the blower tube 20 through the first blower motor 15A to the vent/inlet 30, and pulled into the blower tube 20 through the blower housing 25, the conduit 40, and the check/relief valve 45 from the transport tube 35.

One disadvantage of a pneumatic transmission system that includes a conventional blower assembly having opposing blower motors is that since the path of air-flow includes a non-activated blower motor, a path resistance of the pneumatic transmission system is increased. Thus, an additional amount of force is required for the air to travel through the pneumatic transmission system due to the path resistance encountered at the non-activated blower motor, reducing the distance a given blower motor can cause a driven member such as a carrier to travel. This additional amount of force also results in an increased amount of work for the activated blower motor over time, which decreases the efficiency of the pneumatic transmission system. Such inefficiency can result in an increase in the cost of operation as well as increased wear on the blower motors. For the foregoing reasons, there is a need for a pneumatic transmission system that has a reduced path resistance for air flow and can therefore operate more efficiently and with an increased transmission range.

BRIEF SUMMARY OF THE INVENTION

An object of the present invention is to provide a blower assembly suitable for use with a pneumatic transmission system wherein the blower assembly provides a path having a reduced path resistance for air flow.

Another object of the present invention is to provide a pneumatic transmission system having an increased range over which a carrier may be transmitted and an improved operating efficiency by reducing the pneumatic resistance of the system.

A pneumatic transmission system having features of the present invention comprises at least a first and a second station, each for sending or receiving a carrier, a transport conduit connected between the first station and the second station, wherein the transport conduit permits a transfer of the carrier between the first station and the second station, and a blower assembly. In one embodiment of the invention, the blower assembly comprises a housing and a blower, a bypass path, and a bypass valve all disposed within the housing. The housing is connected to the first station such that air can flow between the housing and the first station. The blower has an inlet/outlet opening which can serve as both an air inlet for providing air from the atmosphere through the housing to the pneumatic transmission system and an air vent for exhausting the air from the pneumatic transmission system through the housing to the atmosphere. The blower is for moving a volume of the air through the transport conduit. The bypass path provides a path through which air can flow without flowing through the first blower. The bypass valve is for blocking the flow of the air through the bypass path when the blower is active.

In another embodiment of the invention, a pneumatic transmission system is provided comprising a first station and a second station, both for sending or receiving a carrier, a transport conduit connected between the first station and the second station for permitting a transfer of a carrier between the first station and the second station, and a blower assembly. The blower assembly includes a housing and a first interior wall, a first blower, a second interior wall, a second blower, and a valve assembly all disposed within the housing. The housing is connected to the first station such that air can flow between the housing and the first station. Also, the housing has an inlet/outlet opening which can serve as an air inlet for providing air from atmosphere through the housing to the pneumatic transmission system and can serve as an air outlet for exhausting air from the pneumatic transmission system through the housing to the atmosphere. The first interior wall has a blower aperture and a bypass aperture. The first blower is mounted through the blower aperture of the first interior wall, while the bypass aperture of the first interior wall provides a path through which the air can flow without flowing through the first blower. The second interior wall has a blower aperture and a bypass aperture. The second blower is mounted through the blower aperture of the second interior wall, while the bypass aperture of the second interior wall provides a path through which the air can flow without flowing through the second blower. The first blower is for moving a volume of air through the transport conduit in a first direction, whereas the second blower is for moving a volume of the air through the transport conduit in a second direction. The valve assembly operates to allow air to pass through the bypass aperture of the second interior wall while the first blower motor is operating and operates to allow air to pass through the bypass aperture of the first interior wall while the second blower motor is operating.

A bypass valve suitable for use in a blower assembly having features of the present invention may include a valve guide, a valve rod slidably engaged with the valve guide, and a blocking member attached to an end portion of the valve rod. Such a bypass valve may be constructed such that the valve rod is capable of sliding with respect to the valve guide in a direction to block the flow of air through a bypass path with the blocking member, and in a second direction to allow the flow of air through the bypass path. If a second bypass path is present, a second blocking member may be attached to a second end portion of the valve rod. In this case, the bypass valve may be constructed such that the valve rod is capable of sliding with respect to the valve guide in a direction to block the flow of air through a bypass path with the blocking member while allowing the flow of air through the second bypass path, and in a second direction to allow the flow of air through the bypass path while blocking the flow of air through the second bypass path with the second blocking member.

Alternately, a bypass valve suitable for use in a blower assembly having features of the present invention may be an electromechanically operating valve which operates based on a control signal to selectively block or allow air to pass through one or more bypass paths.

Finally, the present invention can be implemented in a pneumatic transmission system having a plurality of stations.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
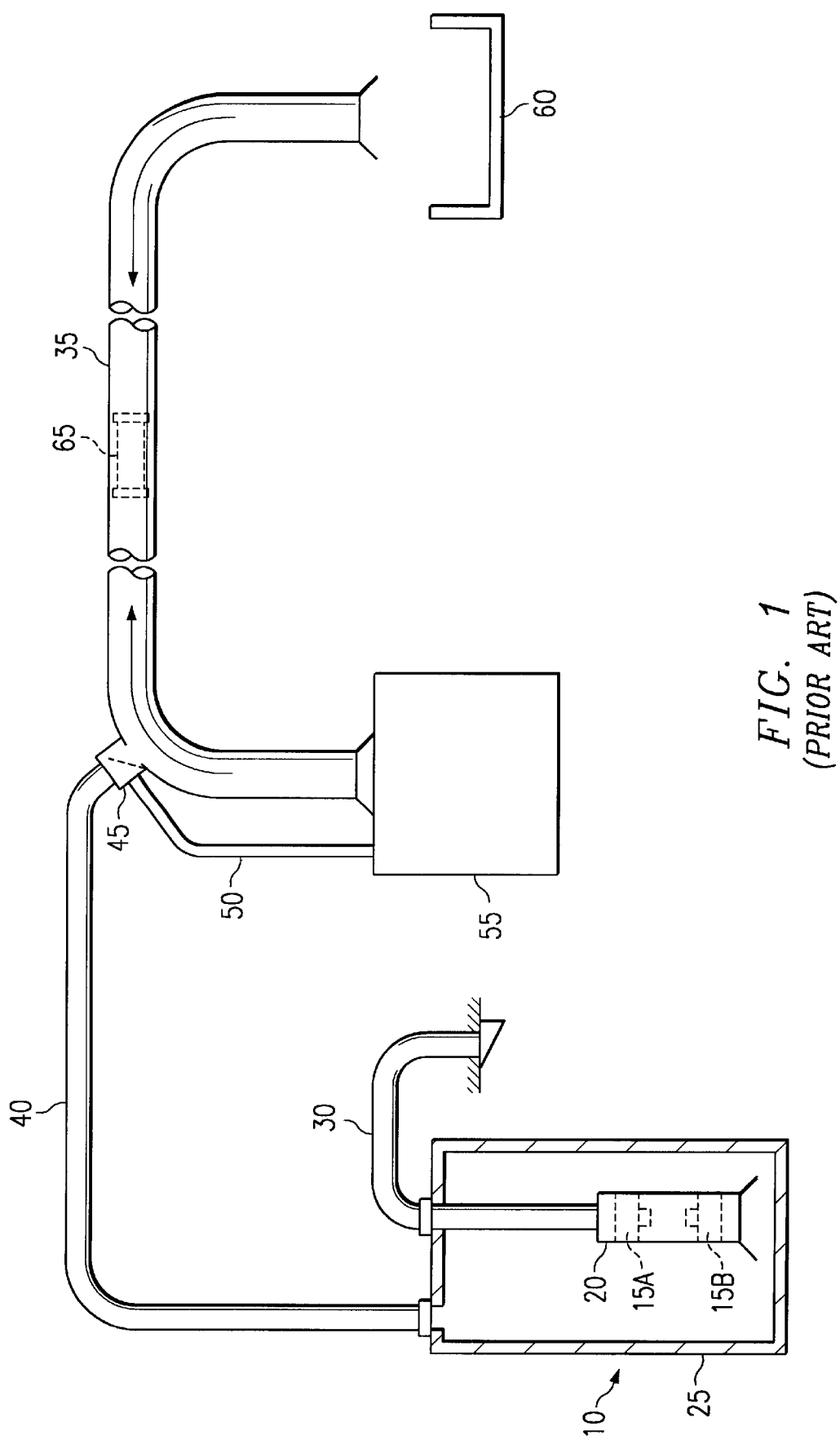
FIG. 1 is a block diagram illustrating a conventional pneumatic transmission system.
Figure 2:
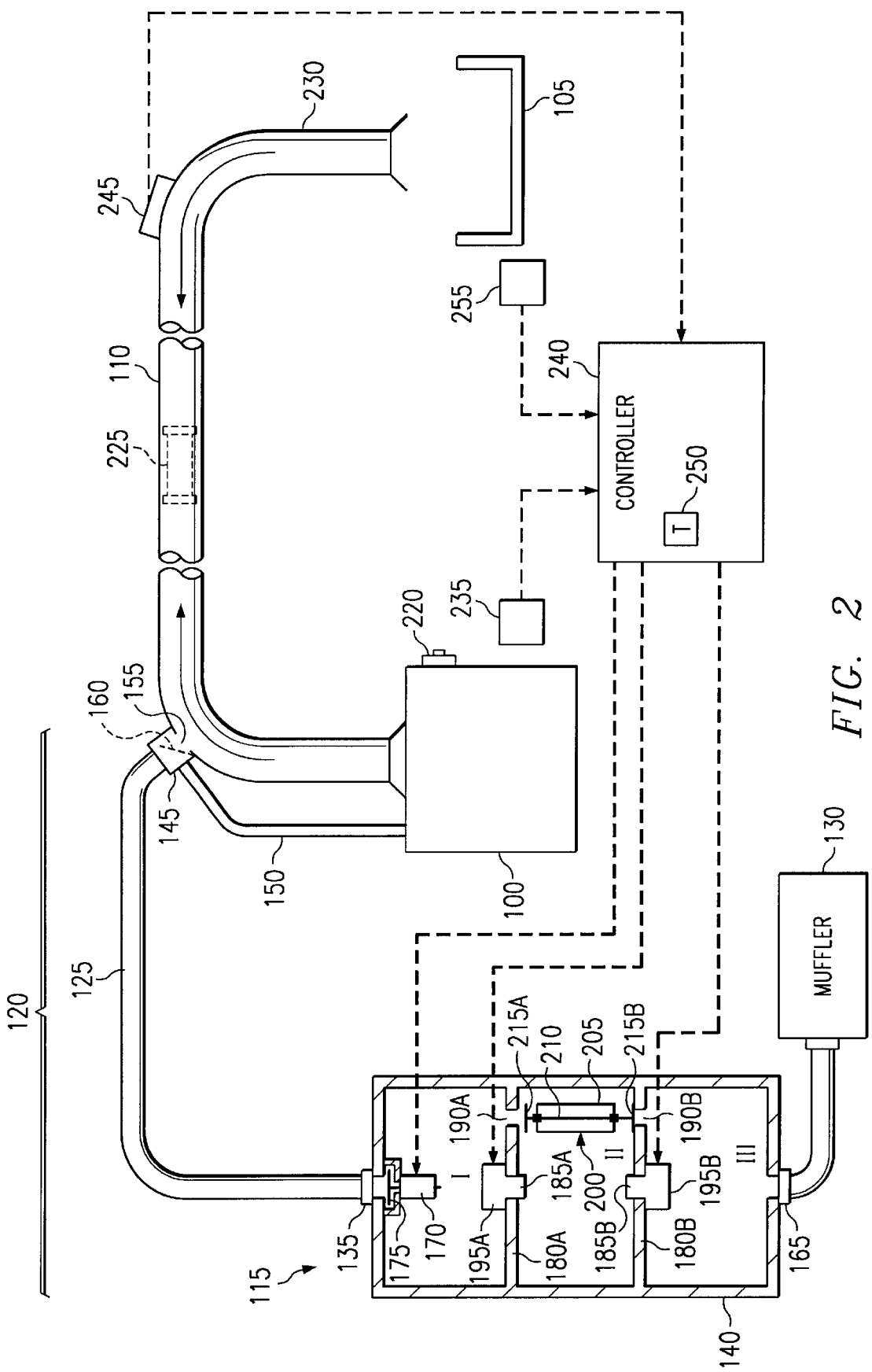
FIG. 2 is a block diagram of a pneumatic transmission system embodying features of the present invention.

FIG. 2 illustrates a pneumatic transmission system containing an embodiment of a blower assembly in accordance with the present invention. The present system comprises a first station 100 and a second station 105 connected by a substantially air tight transport tube 110, which is open to the atmosphere at the second station 105, with a blower assembly 115 being positioned within a supply/exhaust branch 120 which is connected to the first station 100. The supply/exhaust branch 120 includes a conduit 125 which is substantially airtight and a muffler 130 which is open to the atmosphere and can provide air from the atmosphere to the pneumatic transmission system or can allow the exhaust of air from the pneumatic transmission system to the atmosphere. Conduit 125 does not have to be of a similar internal diameter as the transport tube 110 because no carrier is transported therethrough, only air. Conduit 125 is attached at one end to a first blower-housing port 135 in a blower housing 140 and at its other end to check/relief valve 145. A second conduit 150 connects the check valve 145 to the first station 100. The check valve 145 also communicates with the transport tube 110 directly, through a conduit port 155, and comprises a leaf 160, which is adapted to cover the conduit port 155 in certain air flow situations. The blower assembly 115 is comprised of a substantially air tight blower housing 140, shown in phantom, which has the first blower-housing port 135 in a first end portion and a second blower-housing port 165 in a second end portion opposite the first end portion. A solenoid valve 170 is mounted to the first end portion of the blower housing 140 such that, when actuated, the solenoid valve 170 operates to block the first blower-housing port 135 with a valve disk 175, preventing air flow through the first blower-housing port 135. The present invention, however, is not limited to a solenoid valve. A first interior wall 180A and a second interior wall 180B are positioned in the blower housing 140 such that they partition the blower housing 140 into a first chamber I between the first end portion of the blower housing 140 and the first interior wall 180A, a second chamber II between the first and second interior walls 180A and 180B, and a third chamber III between the second interior wall 180B and second end portion of the blower housing 140. Each of the first and second interior walls 180A and 180B includes a blower motor aperture 185A and 185B, respectively, and a bypass aperture 190A and 190B, respectively. A first blower motor 195A is positioned in the first blower motor aperture 185A, and a second blower motor 195B is positioned in the second blower motor aperture 185B. A bypass valve 200 is positioned in the second chamber II of the blower housing 140. The bypass valve 200 includes a valve guide 205 and a valve rod 210 slidably mounted to the valve guide 205. The valve guide 205 is preferably fixed in position relative to the blower housing 140 and the first and second interior walls 180A and 180B. The bypass valve 200 also includes a first blocking member 215A and a second blocking member 215B. The first blocking member 215A is fixed to a first end portion of the valve rod 210 such that, in a first position, the bypass valve 200 operates to block the first bypass aperture 190A with the blocking member 215A, substantially preventing air flow through the first bypass aperture 190A. The second blocking member 215B is fixed to a second end portion opposite the first end portion of the valve rod 210 such that, in a second position, the bypass valve 200 operates to block the second bypass aperture 190B with the blocking member 215B, substantially preventing air flow through the second bypass aperture 190B. The supply/exhaust branch 120 is connected to the first station 100 at one end and open to the atmosphere at the muffler 130 for supplying or exhausting air. The first station 100 can be a closed station, meaning that it can be sealed by closing a door 220 so that, except for the supply/exhaust branch 120, it is substantially closed to the atmosphere during transport of a carrier 225. The second station 105 can be either a closed station with a vent or a station which is open to the atmosphere during transport of the carrier 225, but it is shown as an open station. The carrier 225 is capable of being filled with items to be transferred and is inserted at either station for transfer to the other station.

The transport tube 110, which is connected to the first station 100 at one end and to the second station 105 at its other end, is of sufficient internal diameter such that the carrier 225 can be transmitted therethrough. The transport tube 110 can have any spatial orientation and can include curved portions, straight portions, vertical portions, and horizontal portions, dependent upon the circumstances under which the system is going to be used. For example, the approach leg 230 is shown as a curve from a horizontal direction to a vertical downward direction. However, this approach leg 230 can also remain horizontal or curve in a vertical upward direction as it connects with the second station 105. The transport tube 110 and the carrier 225 can have nearly any desired dimension and cross-section, dependent on the system needs. The transport tube 110 can include any transmission line of any cross-sectional form having a pneumatic channel formed therethrough.

To send the carrier 225 from the first station 100 to the second station 105, the second blower motor 195B is activated to intake air through the muffler 130 and to apply pressurized air to the carrier 225, which creates a ΔP across the carrier 225 and moves the carrier 225 upwardly, out of the first station 100, and then horizontally through the transport tube 110 toward the second station 105. The second blower motor 195B can generate approximately 5 psig behind the carrier 225. Likewise, to send the carrier 225 from the second station 105 to the first station 100, the first blower motor 195A would be activated instead of the second blower motor 195B, to exhaust air through the muffler 130, thereby creating at least a partial vacuum in the transport tube 110 on the first station 100 side of the carrier 225, while the second station 105 side of the carrier 225 remains at 0 psig because it is open to the atmosphere. This ΔP across the carrier 225 generates a force moving the carrier 225 in the opposite, or first station 100 direction.

In order to send the carrier 225 from the first station 100 to the second station 105, the carrier 225 is placed in the transport tube 110 and the door 220 is shut and sealed. The second blower motor 195B is then activated. This can be done by an operator actuating a first-station switch 235, which is coupled to a controller 240. The controller 240 is coupled to the first and second blower motors 195A and 195B for selective activation of the first and second blower motors 195A and 195B. When the first-station switch 235 is actuated, the first-station switch 235 sends a control signal to the controller 240. The controller 240 receives the control signal from the first-station switch 235 and provides a control signal to the second blower motor 195B, to thereby activate the second blower motor 195B. The controller 240 is also coupled to a sensor 245 which is positioned near or on the transport tube 110. The sensor 245 does not need to be in physical contact with the transport tube 110, but it must be positioned such that it is able to sense the carrier 225 as the carrier passes a predetermined location in the transport tube 110 related to the approach of the carrier 225 to the second station 105. The present invention is not limited to an electrical coupling, or even a physical connection between the controller 240 and its peripherals.

The operation of the second blower motor 195B causes the bypass valve 200 to move to a position wherein the second blocking member 215B blocks the second bypass aperture 190B. A more detailed explanation of the operation of the bypass valve 200 is provided below in conjunction with FIGS. 3A and 3B. The second blower motor 195B blows air through the conduit 125 and into the check/relief valve 145. The air flow into the check/relief valve 145 exerts pressure onto the leaf 160, thereby causing the leaf 160 to cover the conduit port 155. With the conduit port 155 blocked, air flows out of the check/relief valve 145, through the second conduit 150, to the first station 100 and creates a ΔP across the carrier 225, thus moving it towards the second station 105. The blower motors 195A and 195B used in this embodiment can be standard vacuum cleaner blower motors such as Model No. 115923 manufactured by Ametek. The first and second blower motors 195A and 195B are substantially equal in size and in output capacity, although mounted in opposite directions. The first and second blower motors 195A and 195B are capable of operating at approximately 23000 RPM and of generating approximately 124 CFM.

As the carrier 225 moves through the transport tube 110, it reaches the portion of the transport tube 110 where it is detected by the sensor 245. The sensor 245 detects the presence of the carrier 225 as it passes a predetermined location in the transport tube 110 and provides a control signal to the controller 240 indicative of that detection. The controller 240 receives this control signal from the sensor 245 and provides a control signal to the second blower motor 195B to thereby deactivate the second blower motor 195B, to the solenoid valve 170 to thereby actuate the solenoid valve 170 thus blocking the first blower-housing port 135 with the valve disk 175, and to start a timer 250. The timer 250 can be an external peripheral device or it can be integrated in the controller 240. In this embodiment, the timer 250 is preferably a Model No. RTE B21 manufactured by IDEC. An air block is created in the conduit 125, and thus in the transport tube 110, by the blocking of the first blower-housing port 135 by the valve disk 175.

Once the air block is on, a finite amount of air remains in the transport tube 110 between the carrier 225 and the first station 100 because no additional air can get by the solenoid valve 170 and through the first blower-housing port 135 in either direction. As the carrier 225 continues to move through the transport tube 110 towards the second station 105, the volume of the portion of the transport tube 110 between the air block and the carrier 225 increases, and as that volume increases, the air pressure in the transport tube 110 behind the carrier 225 decreases because the amount of air between the air block and the carrier 225 remains substantially constant. The pressure on the second station 105 side of the carrier 225, however, is substantially constant at 0 psig because the second station 105 is open to the atmosphere. Therefore, as the pressure between the air block and the carrier 225 decreases as the carrier 225 moves through the final approach section 230 of the transport tube 110, the carrier 225 slows down due to the decreasing ΔP across the carrier 225. In this embodiment, the carrier 225 reaches a point along the transport tube 110 where the pressure behind the carrier 225 decreases to a value less than the 0 psig in front of the carrier 225. This reversal of the ΔP across the carrier 225 creates a force in the direction of the first station 100, thereby further slowing the carrier 225 as the carrier 225 approaches the second station 105. When the predetermined time has elapsed, as noted by the timer 250, the controller 240 deactivates the solenoid valve 170, thereby opening the first blower-housing port 135 and allowing free flow of air through the conduit 125, the second conduit 150 and the transport tube 110. Upon opening of the solenoid valve 170, the leaf 160 in the check/relief valve 145 is free to open, thereby allowing free flow of air through the conduit port 155.

In order to send the carrier 225 from the second station 105 to the first station 100, an operator activates the first blower motor 195A. This activation is accomplished by an operator actuating a second-station switch 255, which is coupled to the controller 240. When the second-station switch 255 is actuated, the second-station switch 255 sends a control signal to the controller 240. The controller 240 receives the control signal from the second-station switch 255 and provides a control signal to the first blower motor 195A, to thereby activate the first blower motor 195A. The operation of the first blower motor 195A causes the bypass valve 200 to move to a position wherein the first blocking member 215A blocks the first bypass aperture 190A. A more detailed explanation of the operation of the bypass valve 200 is provided below in conjunction with FIGS. 3A and 3B. The first blower motor 195A intakes air from the transport tube 110 and exhausts that air through muffler 130 which lowers the pressure in the transport tube 110 and creates a ΔP across the carrier 225 moving it towards the first station 100. Air propelled by the first blower motor 195A entering the check/relief valve 145 from the transport tube 110 holds the leaf 160 in the check/relief valve 145 open, thereby allowing free flow of air through the conduit port 155. Virtually no air flow occurs through the transport tube 110 between the conduit port 155 and the first station 100, through the first station 100, or through the second conduit 150, since the air flow will find the path of least resistance, which is through the conduit port 155.

As the carrier 225 moves through the transport tube 110, it reaches the portion of the transport tube 110 where the conduit port 155 is located. After the carrier 225 passes the conduit port 155, the pressure in the transport tube 110 on the first station 100 side of the carrier 225 increases, thereby decreasing and preferably virtually eliminating, the ΔP across the carrier 225. The carrier 225 free falls into the first station 100.

Figure 3A:
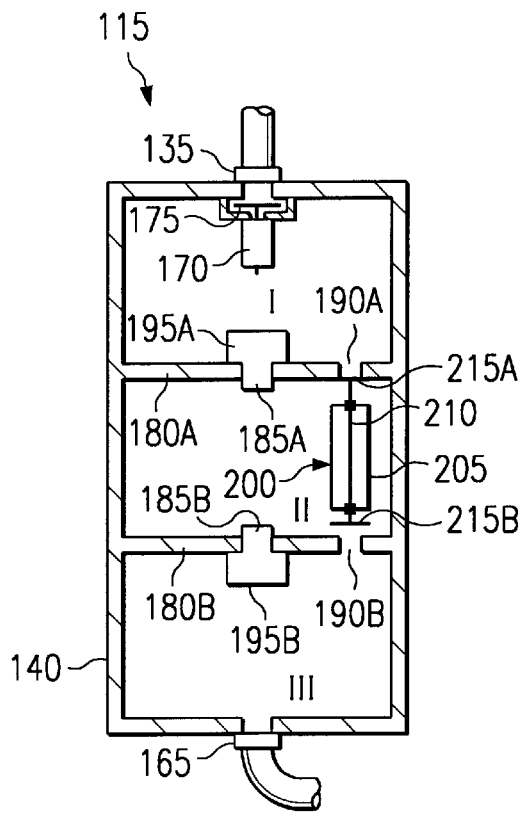
FIGS. 3A and 3B are views of a blower assembly used in the pneumatic transmission system of FIG. 2 showing alternate positions of a valve included in the blower assembly.
Figure 3B:
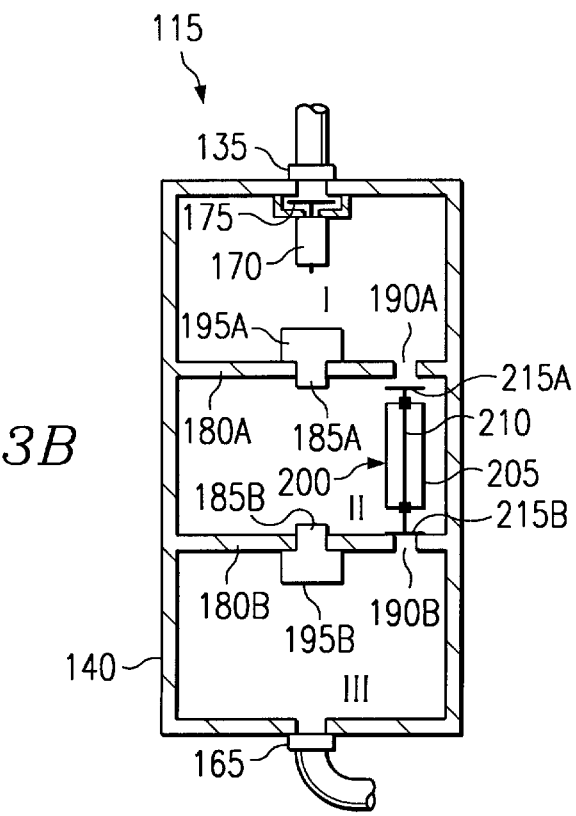

FIGS. 3A and 3B illustrate the blower assembly 115 used in the pneumatic transmission system of FIG. 2 showing alternate positions of the bypass valve 200 included in the blower assembly 115. The valve guide 205 of the bypass valve 200 is fixed in position relative to the blower housing 140. The valve rod 210 is slidably mounted to the valve guide 205 such that it may move between the position shown in FIG. 3A and the position shown in FIG. 3B.

Assuming a situation where the bypass valve 200 and the valve disk 175 are each in the position shown in FIG. 3B upon activation of the first blower motor 195A, then air is pulled into the blower housing 140 through the first blower-housing port 135. As a result, air from the first chamber I of the blower housing 140 is urged into the second chamber II of the blower housing 140 through the first blower motor 195A. This causes a vacuum at the first bypass aperture 190A, urging the air from the second chamber II of the blower housing 140 to the first chamber I of the blower housing 140. This vacuum pulls air in the vicinity of the first blocking member 215A, causing the valve rod 210 to slide relative to the valve guide 205 such that the bypass valve 200 moves to the position shown in FIG. 3A. Once the bypass valve 200 has reached the position shown in FIG. 3A, the path through the second bypass aperture 190B becomes available since it is no longer blocked by the second blocking member 215B. The second bypass aperture 190B now provides a path of least resistance compared to passing through the second blower motor 195B, so air flows from the second chamber II of the blower housing 140 to the third chamber III of the blower housing 140 through the bypass aperture 190B, then the air exits the blower housing 140 through the second blower-housing port 165. Once this process of the bypass valve 200 moving from the position shown in FIG. 3B to the position shown in FIG. 3A is complete, as long as the first blower motor 195A remains activated, the path of air flow through the blower housing 140 will begin at the first blower-housing port 135, pass through the first blower motor 195A, then through the second bypass aperture 190B, then exit the blower housing 140 through the second blower-housing port 165. Virtually no air flow occurs through the second blower motor 195B between the second and third chambers II and III of the blower housing 140, since the air flow will find the path of least resistance, which is through the second bypass aperture 190B. Also, as long as the first blower motor 195A remains activated, the bypass valve 200 will remain substantially at the position shown in FIG. 3A. This is because the force created by the combination of the vacuum pulling the first blocking member 215A to the first bypass aperture 190A and the air pushing the first blocking member 215A towards the first bypass aperture 190A will be greater than the force created by the air pushing the second blocking member 215B towards the second bypass aperture 190B.

Assuming a situation where the bypass valve 200 and the valve disk 175 are each in the position shown in FIG. 3A upon activation of the second blower motor 195B, then air is pulled into the blower housing 140 through the second blower-housing port 165. As a result, air from the third chamber III of the blower housing 140 is urged into the second chamber II of the blower housing 140 through the second blower motor 195B. This causes a vacuum at the second bypass aperture 190B, urging the air from the second chamber II of the blower housing 140 to the third chamber III of the blower housing 140. This vacuum pulls air in the vicinity of the second blocking member 215B, causing the valve rod 210 to slide relative to the valve guide 205 such that the bypass valve 200 moves to the position shown in FIG. 3B. Once the bypass valve 200 has reached the position shown in FIG. 3B, the path through the first bypass aperture 190A becomes available since it is no longer blocked by the first blocking member 215A. The first bypass aperture 190A now provides a path of least resistance compared to passing through the first blower motor 195A, so air flows from the second chamber II of the blower housing 140 to the first chamber I of the blower housing 140 through the bypass aperture 190A, then the air exits the blower housing 140 through the first blower-housing port 135. Once this process of the bypass valve 200 moving from the position shown in FIG. 3A to the position shown in FIG. 3B is complete, as long as the second blower motor 195B remains activated, the path of air flow through the blower housing 140 will begin at the second blower-housing port 165, pass through the second blower motor 195B, then through the first bypass aperture 190A, then exit the blower housing 140 through the first blower-housing port 135. Virtually no air flow occurs through the first blower motor 195A between the second and first chambers II and I of the blower housing 140, since the air flow will find the path of least resistance, which is through the first bypass aperture 190A. Also, as long as the second blower motor 195B remains activated, the bypass valve 200 will remain substantially at the position shown in FIG. 3B. This is because the force created by the combination of the vacuum pulling the second blocking member 215B to the second bypass aperture 190B and the air pushing the second blocking member 215B towards the second bypass aperture 190B will be greater than the force created by the air pushing the first blocking member 215A towards the first bypass aperture 190A.

Figure 4:
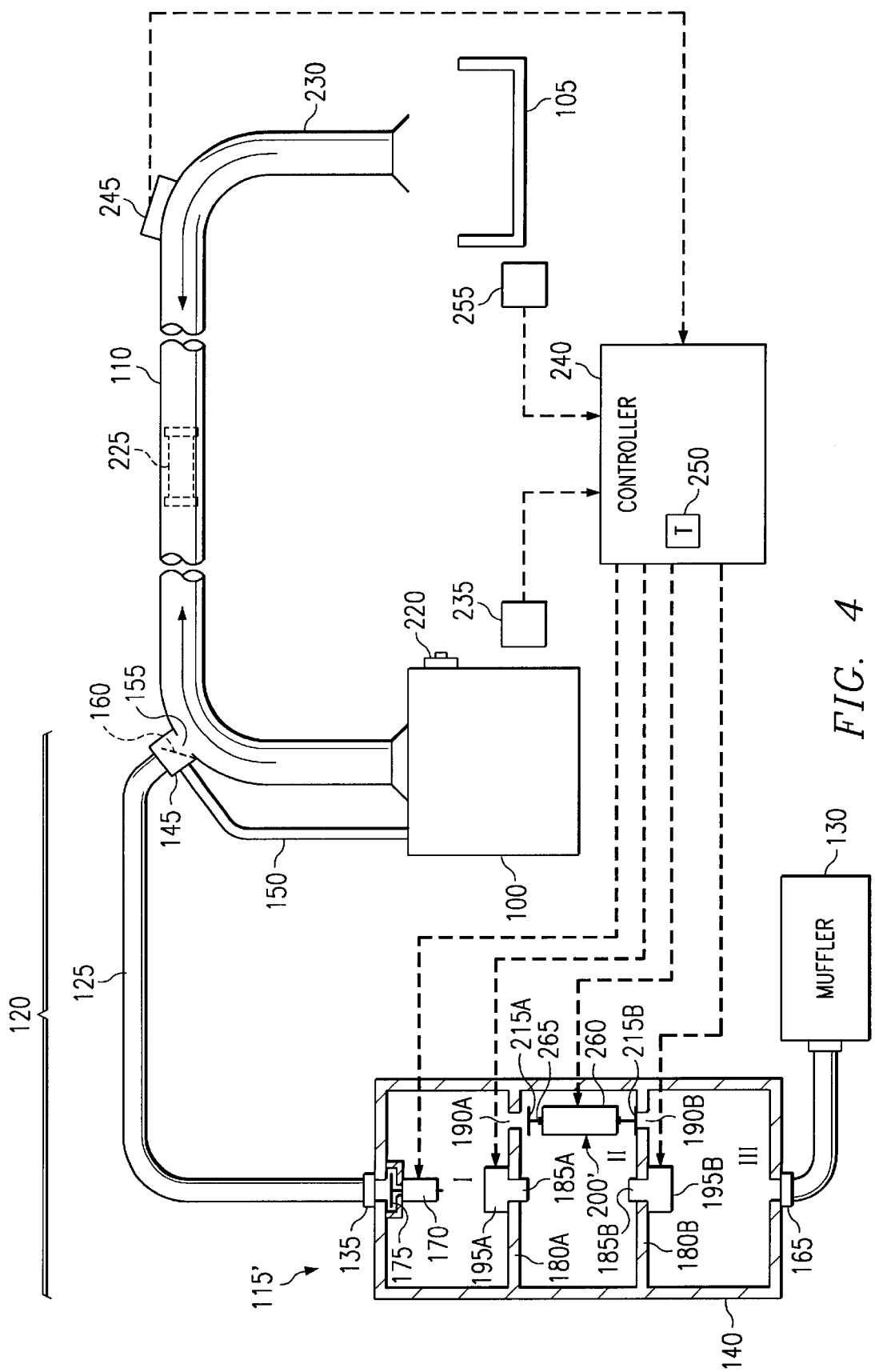
FIG. 4 is a block diagram of another version of a pneumatic transmission system embodying features of the present invention.

FIG. 4 illustrates a pneumatic transmission system containing a second embodiment of a blower assembly in accordance with the present invention. This pneumatic transmission system is substantially the same in structure and operation as the first embodiment shown in FIG. 2 and described above, except that the blower assembly 115 has been replaced with a blower assembly 115', which includes an electromechanical bypass valve 200' in place of the bypass valve 200. Also, a signal path is provided from the controller 240 to the electromechanical bypass valve 200'. As stated above, the present invention is not limited to an electrical coupling, or even a physical connection between the controller 240 and its peripherals.

As mentioned above, the structure of the pneumatic transmission system shown in FIG. 4 is substantially the same as that of the pneumatic transmission system shown in FIG. 2. However, the blower assembly 115' in the pneumatic transmission system shown in FIG. 4 includes the option of an electromechanically operated bypass valve, in this case the electromechanical bypass valve 200'. The electromechanical bypass valve 200' includes a solenoid 260 having an armature 265 extending therethrough, projecting from opposing ends of the solenoid 260. The electromechanical bypass valve 200' also includes a first blocking member 215A fixed to a first end portion of the armature 265 such that, in a first position, the electromechanical bypass valve 200' operates to block the first bypass aperture 190A with the first blocking member 215A, substantially preventing air flow through the first bypass aperture 190A. The electromechanical bypass valve 200' further includes a second blocking member 215B fixed to a second end portion of the armature 265 such that, in a second position, the electromechanical bypass valve 200' operates to block the second bypass aperture 190B with the second blocking member 215B, substantially preventing air flow through the second bypass aperture 190B.

The operation of the pneumatic transmission system shown in FIG. 4 is substantially the same as that of the pneumatic transmission system shown in FIG. 2, except for the differences due to the use of the electromechanical bypass valve 200'. In this embodiment, in order to send the carrier 225 from the first station 100 to the second station 105, the carrier 225 is placed in the transport tube 110, the door 220 is shut and sealed, and both the second blower motor 195B and the electromechanical bypass valve 200' are then activated. This can be done by an operator actuating a first-station switch 235, which is coupled to a controller 240. The controller 240 is coupled to the first and second blower motors 195A and 195B for selective activation of the first and second blower motors 195A and 195B, and to the electromechanical bypass valve 200' for activation of the electromechanical bypass valve 200' such that the armature 265 is selectively positioned at one of the first and second positions. When the first-station switch 235 is actuated, the first-station switch 235 sends a control signal to the controller 240. The controller 240 receives the control signal from the first-station switch 235 and provides a control signal to the second blower motor 195B, to thereby activate the second blower motor 195B. The controller 240 also provides a control signal to the electromechanical bypass valve 200' to thereby activate the solenoid 260 such that the armature 265 is moved to the second position as shown in FIG. 4. Once the armature 265 is in the second position, the second blocking member 215B will block the second bypass aperture 190B, substantially preventing air flow through the second bypass aperture 190B, while at the same time distancing the first blocking member 215A from the first bypass aperture 190A, allowing air flow through the first bypass aperture 190A.

In order to send the carrier 225 from the second station 105 to the first station 100, an operator activates the first blower motor 195A and the electromechanical bypass valve 200'. This activation is accomplished by an operator actuating a second-station switch 255, which is coupled to the controller 240. When the second-station switch 255 is actuated, the second-station switch 255 sends a control signal to the controller 240. The controller 240 receives the control signal from the second-station switch 255 and provides a control signal to the first blower motor 195A, to thereby activate the first blower motor 195A. The controller 240 also provides a control signal to the electromechanical bypass valve 200' to thereby activate the solenoid 260 such that the armature 265 is moved to the first position (not shown). Once the armature 265 is in the first position, the first blocking member 215A will block the first bypass aperture 190A, substantially preventing air flow through the first bypass aperture 190A, while at the same time distancing the second blocking member 215B from the second bypass aperture 190B, allowing air flow through the second bypass aperture 190B.

While the second embodiment has been described as comprising an electromechanical bypass valve 200' which includes a single solenoid 260 and a single armature 265, the electromechanical bypass valve 200' is not limited to this configuration. Rather, there are many well-known types of electromechanical devices which could be readily substituted without departing from the spirit and scope of the invention. For example, a pair of solenoids may be mounted back to back such that an armature of each solenoid may be selectively activated by a control signal to block or not block a respective bypass aperture with a respective blocking member. Also, a bypass valve other than the ones described with the embodiments herein may be selected without departing from the spirit and scope of the invention. For example, a suitable bypass valve may be constructed using a hydraulic, pneumatic, electrical or other type of controllable actuating device.

Finally, while the blower assembly of the present invention has been shown for use with the pneumatic transmission systems shown in FIGS. 2 and 4, the blower assembly of the present invention is not limited to use with such pneumatic transmission systems. Rather, the blower assembly of the present invention is suitable for use in any type of pneumatic transmission system in which it is desirable to forcibly move air in one or more directions. Moreover, the blower assembly of the present invention is suitable for any other type of application in which it is desirable to forcibly move air in one or more directions.

While preferred embodiments of the present invention has been described, with respect to certain preferred aspects, it should be apparent to those skilled in the art that it is not so limited. Various other modifications may be made without departing from the spirit and scope of the invention. It is intended that the following claims be interpreted to embrace all such variations and modifications.

What is claimed is:

1. A blower unit adapted for use in a pneumatic transmission system comprising:
   a housing having first and second inlet/outlet openings through which air can flow,
   a first blower, disposed within said housing, for moving a volume of air from said first inlet/outlet opening to said second inlet/outlet opening;
   a first bypass path, disposed within said housing, through which air can flow from said second inlet/outlet opening to said first inlet/outlet opening without flowing through said first blower; and
   a first valve element, disposed in said first bypass path, for substantially blocking a flow of air through said first bypass path when said first blower is active;
   a second blower, disposed within said housing, for moving a volume of air from said second inlet/outlet opening to said first inlet/outlet opening;
   a second bypass path, disposed within said housing, through which air can flow from said first inlet/outlet opening to said second inlet/outlet opening without flowing through said second blower; and
   a second valve element, disposed in said second bypass path, for substantially blocking a flow of air through said second bypass path when said second blower is active;
   wherein said first and second blowers are mounted in said housing such that said second blower is downstream of said first blower when air is flowing from said first inlet/outlet opening to said second inlet/outlet opening and said first blower is downstream of said second blower when air is flowing from said second inlet/outlet opening to said first inlet/outlet opening.

2. A blower unit, according to claim 1, wherein air being moved by said first blower causes said first valve element to substantially block a flow of air through said first bypass path, and wherein air being moved by said second blower causes said second valve element to substantially block a flow of air through said second bypass path.

3. A blower unit in accordance with claim 1,
   wherein said first valve element allows air to flow through said first bypass path when said first blower is inactive and said second blower is active, and
   wherein said second valve element allows air to flow through said second bypass path when said first blower is active and said second blower is inactive.

4. A blower unit, according to claim 3, further comprising:
   a valve guide; and
   a valve rod slidably engaged with said valve guide;
   wherein said first valve element is attached to a first end of said valve rod;
   wherein said second valve element is attached to a second end of said valve rod;
   wherein said valve rod is capable of sliding with respect to said valve guide in a first slide direction to substantially block a flow of air through said first bypass path with said first valve element and to allow a flow of air through said second bypass path; and
   wherein said valve rod is capable of sliding with respect to said valve guide in a second slide direction, which is opposite to said first slide direction, to substantially block a flow of air through said second bypass path with said second valve element and to allow a flow of air through said first bypass path.

5. A blower unit, according to claim 1, further comprising a first interior wall member and a second interior wall member, each of said first and second interior wall members being disposed within said housing and spaced apart from each other, wherein said first interior wall member and a first end portion of said housing form a first chamber, wherein said second interior wall member and a second end portion of said housing form a second chamber, wherein said first and second interior wall members and an intermediate portion of said housing form an intermediate chamber, wherein said first inlet/outlet opening is in said first end portion of said housing which forms said first chamber and said second inlet/outlet opening is in said second end portion of said housing which forms said second chamber, wherein each of said first and second interior wall members has a blower aperture and a bypass aperture;
   wherein said first blower is mounted in association with the blower aperture of said first interior wall member;
   wherein said first bypass path passes through the bypass aperture of said first interior wall member;
   wherein said second blower is mounted in association with the blower aperture of said second interior wall member;
   wherein said second bypass path passes through the bypass aperture of said second interior wall member, and
   wherein said first valve element substantially blocks a flow of air through the bypass aperture of said first interior wall member when the first blower is active and the second valve element substantially blocks a flow of air through the bypass aperture of said second interior wall member when the second blower is active.

6. A blower unit, according to claim 5, further comprising:
   a valve guide; and
   a valve rod slidably engaged with said valve guide;
   wherein said first valve element is attached to a first end of said valve rod;
   wherein said second valve element is attached to a second end of said valve rod;
   wherein said valve rod is capable of sliding with respect to said valve guide in a first slide direction to substantially block a flow of air through said first bypass path with said first valve element and to allow a flow of air through said second bypass path; and
   wherein said valve rod is capable of sliding with respect to said valve guide in a second slide direction, which is opposite to said first slide direction, to substantially block a flow of air through said second bypass path with said second valve element and to allow a flow of air through said first bypass path.

7. A blower unit, according to claim 6, wherein said rod guide, said valve rod, and said first and second valve elements are positioned in said intermediate chamber;
   wherein the first blower is capable of moving air such that a first force is generated which is sufficient to move said first valve element against said first interior wall member so as to cover the bypass aperture of said first interior wall; and
   wherein the second blower is capable of moving air such that a second force is generated which is sufficient to move said second valve element against said second interior wall member so as to cover the bypass aperture of said second interior wall member.

8. A blower unit, according to claim 7, wherein said first force comprises a pressure differential between pressure in said first chamber and pressure in said intermediate chamber, with the pressure in said intermediate chamber being greater than the pressure in said first chamber; and wherein said second force comprises a pressure differential between pressure in second first chamber and pressure in said intermediate chamber, with the pressure in said intermediate chamber being greater than the pressure in said second chamber.

9. A blower unit, according to claim 1, wherein said first and second valve elements are capable of being electromechanically actuated.

10. A blower unit, according to claim 9, further comprising a solenoid having a first end portion, and an armature having a first end portion, wherein the first end portion of said armature extends from the first end portion of the solenoid, wherein said first valve element is attached to the first end portion of said armature.

11. A blower unit, according to claim 10, wherein said solenoid has a second end portion opposite said first end portion of the solenoid, and said armature has a second end portion opposite said first end portion of the armature, wherein the second end portion of the armature extends from the second end portion of the solenoid, and wherein said second valve element is attached to the second end portion of the armature.

12. A blower unit, according to claim 11, further comprising a second solenoid having a first end portion, and a second armature having a first end portion, wherein the first end portion of the second armature extends from the first end portion of the second solenoid, wherein said second valve element is attached to the first end portion of said second armature.

13. A blower unit adapted for use in a pneumatic transmission system comprising:
    a housing having a first chamber in a first end portion of the housing, a second chamber in a second end portion of the housing, and an intermediate chamber between the first chamber and the second chamber, said first end portion having a first inlet/outlet opening through which air can flow in and out of said housing, and said second end portion having a second inlet/outlet opening through which air can flow in and out of said housing;
    a first blower disposed within the housing such that the first blower can move air from the first chamber to the intermediate chamber;
    a first bypass path providing a path for air to flow between the first chamber and the intermediate chamber; and
    a first blocking member for substantially blocking the first bypass path while the first blower is moving air from the first chamber to the intermediate chamber;
    a second blower disposed within said housing such that the second blower can move air from the second chamber to the intermediate chamber;
    a second bypass path providing a path for air to flow between the second chamber and the intermediate chamber; and
    a second blocking member for substantially blocking the second bypass path while the second blower is moving air from the second chamber to the intermediate chamber;
    wherein said first and second blowers are mounted in said housing such that said second blower is downstream of said first blower when air is flowing from said first inlet/outlet opening to said second inlet/outlet opening and said first blower is downstream of said second blower when air is flowing from said second inlet/outlet opening to said first inlet/outlet opening.

14. A blower unit, according to claim 13, wherein air being moved by said first blower causes said first blocking member to substantially block a flow of air through said first bypass path, and wherein air being moved by said second blower causes said second blocking member to substantially block a flow of air through said second bypass path.

15. A blower unit, according to claim 13, wherein said first blocking member allows air to flow through said first bypass path when said first blower is inactive and said second blower is active, and wherein said second valve element allows air to flow through said second bypass path when said first blower is active and said second blower is inactive.

16. A blower unit, according to claim 15, further comprising:
    a valve guide; and
    a valve rod slidably engaged with said valve guide;
    wherein said first blocking member is attached to a first end of said valve rod;
    wherein said second blocking member is attached to a second end of said valve rod;
    wherein said valve rod is capable of sliding with respect to said valve guide in a first slide direction to substantially block a flow of air through said first bypass path with said first blocking member and to allow a flow of air through said second bypass path; and
    wherein said valve rod is capable of sliding with respect to said valve guide in a second slide direction, which is opposite to said first slide direction, to substantially block a flow of air through said second bypass path with said second blocking member and to allow a flow of air through said first bypass path.

17. A blower unit, according to claim 13, further comprising a first interior wall member and a second interior wall member, each of said first and second interior wall members being disposed within said housing and spaced apart from each other, wherein said first interior wall member and said first end portion of said housing form said first chamber, wherein said second interior wall member and said second end portion of said housing form said second chamber, wherein said first and second interior wall members and an intermediate portion of said housing form said intermediate chamber, wherein said first inlet/outlet opening is in said first end portion of said housing which forms said first chamber and said second inlet/outlet opening is in said second end portion of said housing which forms said second chamber, wherein each of said first and second interior wall members has a blower aperture and a bypass aperture;
    wherein said first blower is mounted in association with the blower aperture of said first interior wall member and said first bypass path passes through the bypass aperture of said first interior wall member;
    wherein said second blower is mounted in association with the blower aperture of said second interior wall member and said second bypass path passes through the bypass aperture of said second interior wall member, and
    wherein said first blocking member substantially blocks a flow of air through the bypass aperture of said first interior wall member when the first blower is active and the second blocking member substantially blocks a flow of air through the bypass aperture of said second interior wall member when the second blower is active.

18. A blower unit, according to claim 17, further comprising:
a valve guide; and
a valve rod slidably engaged with said valve guide;
wherein said first blocking member is attached to a first end of said valve rod;
wherein said second blocking member is attached to a second end of said valve rod;
wherein said valve rod is capable of sliding with respect to said valve guide in a first slide direction to substantially block a flow of air through said first bypass path with said first blocking member and to allow a flow of air through said second bypass path; and
wherein said valve rod is capable of sliding with respect to said valve guide in a second slide direction, which is opposite to said first slide direction, to substantially block a flow of air through said second bypass path with said second blocking member and to allow a flow of air through said first bypass path.

19. A blower unit, according to claim 18, wherein said rod guide, said valve rod, and said first and second blocking members are positioned in said intermediate chamber;
wherein the first blower is capable of moving air such that a first force is generated which is sufficient to move said first blocking member against said first interior wall member so as to cover the bypass aperture of said first interior wall; and
wherein the second blower is capable of moving air such that a second force is generated which is sufficient to move said second blocking member against said second interior wall member so as to cover the bypass aperture of said second interior wall member.

20. A blower unit, according to claim 15, wherein said first force comprises a pressure differential between pressure in said first chamber and pressure in said intermediate chamber, with the pressure in said intermediate chamber being greater than the pressure in said first chamber; and
wherein said second force comprises a pressure differential between pressure in second first chamber and pressure in said intermediate chamber, with the pressure in said intermediate chamber being greater than the pressure in said second chamber.

21. A blower unit, according to claim 13, wherein said first and second blocking members are capable of being electromechanically actuated.

22. A blower unit, according to claim 21, further comprising a solenoid having a first end portion, and an armature having a first end portion, wherein the first end portion of said armature extends from the first end portion of the solenoid, wherein said first blocking member is attached to the first end portion of said armature.

23. A blower unit, according to claim 22, wherein said solenoid has a second end portion opposite said first end portion of the solenoid, and said armature has a second end portion opposite said first end portion of the armature, wherein the second end portion of the armature extends from the second end portion of the solenoid, and wherein said second blocking member is attached to the second end portion of the armature.

24. A blower unit, according to claim 22, further comprising a second solenoid having a first end portion, and a second armature having a first end portion, wherein the first end portion of the second armature extends from the first end portion of the second solenoid, wherein said second blocking member is attached to the first end portion of said second armature.

25. A pneumatic transmission system, comprising:
a first station for sending or receiving a carrier;
a second station for sending or receiving the carrier;
a transport conduit which is connected between the first station and the second station, wherein the transport conduit permits a transfer of the carrier between the first station and the second station;
a blower unit comprising:
a housing having first and second inlet/outlet openings through which air can flow;
a first blower, disposed within said housing, for moving a volume of air from said first inlet/outlet opening to said second inlet/outlet opening;
a first bypass path, disposed within said housing, through which air can flow from said second inlet/outlet opening to said first inlet/outlet opening without flowing through said first blower; and
a first valve element, disposed in said first bypass path, for substantially blocking a flow of air through said first bypass path when said first blower is active,
wherein said blower unit is in communication with said transport conduit such that air can flow from the first inlet/outlet opening to the transport conduit and from the transport conduit to the first inlet/outlet opening;
a second blower, disposed within said housing, for moving a volume of air from said second inlet/outlet opening to said first inlet/outlet opening;
a second bypass path, disposed within said housing, through which air can flow from said first inlet/outlet opening to said second inlet/outlet opening without flowing through said second blower; and
a second valve element, disposed in said second bypass path, for substantially blocking a flow of air through said second bypass path when said second blower is active;
wherein said first and second blowers are mounted in said housing such that said second blower is downstream of said first blower when air is flowing from said first inlet/outlet opening to said second inlet/outlet opening and said first blower is downstream of said second blower when air is flowing from said second inlet/outlet opening to said first inlet/outlet opening.

26. A pneumatic transmission system, according to claim 25, wherein air being moved by said first blower causes said first valve element to substantially block a flow of air through said first bypass path, and wherein air being moved by said second blower causes said second valve element to substantially block a flow of air through said second bypass path.

27. A pneumatic transmission system, according to claim 25, wherein said first valve element allows air to flow through said first bypass path when said first blower is inactive and said second blower is active, and
wherein said second valve element allows air to flow through said second bypass path when said first blower is active and said second blower is inactive.

28. A pneumatic transmission system, according to claim 27, further comprising:
a valve guide; and
a valve rod slidably engaged with said valve guide;
wherein said first valve element is attached to a first end of said valve rod;

wherein said second valve element is attached to a second end of said valve rod;

wherein said valve rod is capable of sliding with respect to said valve guide in a first slide direction to substantially block a flow of air through said first bypass path with said first valve element and to allow a flow of air through said second bypass path; and wherein said valve rod is capable of sliding with respect to said valve guide in a second slide direction, which is opposite to said first slide direction, to substantially block a flow of air through said second bypass path with said second valve element and to allow a flow of air through said first bypass path.

29. A pneumatic transmission system, according to claim 25, further comprising a third valve element which, in a first position, substantially blocks the flow of air from the first inlet/outlet to the transport conduit and from the transport conduit to the first inlet/outlet, and which, in a second position, allows the flow of air from the first inlet/outlet to the transport conduit and from the transport conduit to the first inlet/outlet.

30. A pneumatic transmission system, according to claim 29, further comprising a check/relief valve for substantially blocking a flow of air from the first inlet/outlet to the transport conduit, wherein said blower unit is in communication with said first station such that air can flow from the first inlet/outlet opening to the first station.

31. A pneumatic transmission system, according to claim 30, further comprising:

a sensor associated with the transport conduit so that the sensor is capable of detecting a presence of the carrier at a predetermined location in the transport conduit associated with an approach of the carrier to one of the first station and the second station and of generating a control signal in response to a detection of the carrier by the sensor;

a controller coupled to the sensor and to the first blower, wherein the controller activates the first blower to move the carrier between the first station and the second station and then deactivates the first blower and closes the valve in response to the control signal from the sensor, indicating the detection of the carrier at the predetermined location to thereby form an air block within the transport conduit to decrease a differential pressure across the carrier and cause the carrier to slow down as the carrier approaches the one of the first station and the second station; and a timer capable of providing a timing control signal when a predetermined amount of time has elapsed, and wherein the controller activates the timer in response to the detection of the carrier at the predetermined location in the transport conduit associated with the approach of the carrier to the one of the first station and the second station and the controller opens the valve in response to the timing control signal.

32. A pneumatic transmission system, according to claim 25, further comprising a first interior wall member and a second interior wall member, each of said first and second interior wall members being disposed within said housing and spaced apart from each other, wherein said first interior wall member and a first end portion of said housing form a first chamber, wherein said second interior wall member and a second end portion of said housing form a second chamber, wherein said first and second interior wall members and an intermediate portion of said housing form an intermediate chamber, wherein said first inlet/outlet opening is in said first end portion of said housing which forms said first chamber and said second inlet/outlet opening is in said second end portion of said housing which forms said second chamber, wherein each of said first and second interior wall members has a blower aperture and a bypass aperture;

wherein said first blower is mounted in association with the blower aperture of said first interior wall member and said first bypass path passes through the bypass aperture of said first interior wall member;

wherein said second blower is mounted in association with the blower aperture of said second interior wall member and said second bypass path passes through the bypass aperture of said second interior wall member, and wherein said first valve element substantially blocks a flow of air through the bypass aperture of said first interior wall member when the first blower is active and the second valve element substantially blocks a flow of air through the bypass aperture of said second interior wall member when the second blower is active.

33. A pneumatic transmission system, according to claim 32, further comprising:

a valve guide; and a valve rod slidably engaged with said valve guide;

wherein said first valve element is attached to a first end of said valve rod;

wherein said second valve element is attached to a second end of said valve rod;

wherein said valve rod is capable of sliding with respect to said valve guide in a first slide direction to substantially block a flow of air through said first bypass path with said first valve element and to allow a flow of air through said second bypass path; and wherein said valve rod is capable of sliding with respect to said valve guide in a second slide direction, which is opposite to said first slide direction, to substantially block a flow of air through said second bypass path with said second valve element and to allow a flow of air through said first bypass path.

34. A pneumatic transmission system, according to claim 28, wherein said rod guide, said valve rod, and said first and second valve elements are positioned in said intermediate chamber;

wherein the first blower is capable of moving air such that a first force is generated which is sufficient to move said first valve element against said first interior wall member so as to cover the bypass aperture of said first interior wall; and wherein the second blower is capable of moving air such that a second force is generated which is sufficient to move said second valve element against said second interior wall member so as to cover the bypass aperture of said second interior wall member.

35. A pneumatic transmission system, according to claim 34, wherein said first force comprises a pressure differential between pressure in said first chamber and pressure in said intermediate chamber, with the pressure in said intermediate chamber being greater than the pressure in said first chamber; and wherein said second force comprises a pressure differential between pressure in second first chamber and pressure in said intermediate chamber, with the pressure in said intermediate chamber being greater than the pressure in said second chamber.

36. A pneumatic transmission system, according to claim 25, wherein said first and second valve elements are capable of being electromechanically actuated.

37. A pneumatic transmission system, according to claim 36, further comprising a solenoid having a first end portion, and an armature having a first end portion, wherein the first end portion of said armature extends from the first end portion of the solenoid, wherein said first valve element is attached to the first end portion of said armature.

38. A pneumatic transmission system, according to claim 37, wherein said solenoid has a second end portion opposite said first end portion of the solenoid, and said armature has a second end portion opposite said first end portion of the armature, wherein the second end portion of the armature extends from the second end portion of the solenoid, and wherein said second valve element is attached to the second end portion of the armature.

39. A pneumatic transmission system, according to claim 38, further comprising a controller for signaling said solenoid to move said armature to one of a first position, wherein said first valve element substantially blocks air flow through said first bypass path, and a second position, wherein said second valve element substantially blocks air flow through said second bypass path.

40. A pneumatic transmission system, according to claim 37, further comprising a second solenoid having a first end portion, and a second armature having a first end portion, wherein the first end portion of the second armature extends from the first end portion of the second solenoid, wherein said second valve element is attached to the first end portion of said second armature.

41. A pneumatic transmission system, according to claim 40, further comprising a controller for signaling said solenoid to move said armature to a position such that said first valve element substantially blocks air flow through said first bypass path, and for signaling said second solenoid to move said second armature to a position such that said second valve element substantially blocks air flow through said second bypass path.

* * * * *

UNITED STATES PATENT AND TRADEMARK OFFICE
CERTIFICATE OF CORRECTION

PATENT NO. : 6,592,302 B2
DATED : July 15, 2003
INVENTOR(S) : Jack E. Balko

It is certified that error appears in the above-identified patent and that said Letters Patent is hereby corrected as shown below:

<u>Title page,</u>
Item [75], Inventors, delete "Framers" and insert -- Farmers --.

<u>Column 15,</u>
Line 38, delete "19", and insert -- 15 --.

<u>Column 18,</u>
Line 41, delete "28", and insert -- 33 --.

Signed and Sealed this

Twenty-seventh Day of April, 2004

JON W. DUDAS
*Acting Director of the United States Patent and Trademark Office*